even of Patent: Jan. 1, 1991

United States Patent [19]
Gaebe

[11] Patent Number: 4,981,335
[45] Date of Patent: Jan. 1, 1991

[54] OPTICAL PACKAGE ARRANGEMENT WITH REDUCED REFLECTIONS

[75] Inventor: Carl E. Gaebe, Fleetwood, Pa.

[73] Assignee: AT&T Bell Laboratories, Murray Hill, N.J.

[21] Appl. No.: 422,876

[22] Filed: Oct. 17, 1989

[51] Int. Cl.$^5$ .............................................. G02B 6/32
[52] U.S. Cl. ................... 350/96.18; 350/96.15
[58] Field of Search .............. 350/96.15, 96.18, 96.19, 350/96.20

[56] References Cited

U.S. PATENT DOCUMENTS

| | | | |
|---|---|---|---|
| 3,875,422 | 4/1975 | Stolen | 350/96.19 |
| 4,252,404 | 2/1981 | Divita | 350/96.19 |
| 4,639,075 | 1/1987 | Salour et al. | 350/96.15 |
| 4,790,618 | 12/1988 | Abe | 350/96.15 |
| 4,893,890 | 1/1990 | Lutes | 350/96.18 |

FOREIGN PATENT DOCUMENTS

| | | | |
|---|---|---|---|
| 0315270 | 5/1989 | European Pat. Off. | 350/96.18 |
| 53-98849 | 8/1978 | Japan | 350/96.19 |
| 54-146645 | 11/1979 | Japan | 350/96.19 |

Primary Examiner—John D. Lee
Assistant Examiner—John Ngo
Attorney, Agent, or Firm—W. W. Koba

[57] ABSTRACT

An optical package arrangement is disclosed which is capable of reducing internal reflections while maintaining a common axis between the input device (for example, a laser diode) the output device (for example, an optical fiber) and various elements interposed therebetween. The output device is designed to include a bevel angle ($\beta$) for redirecting reflections away from the common axis. In accordance with the teachings of the invention, an optical element (for example, an isolator, filter, window or any combination thereof) is inserted between the input and output devices and oriented at a tilt angle ($\theta$) so that reflected signals from the element are also redirected away from the common axis. Focusing means disposed between the optical element and the output device is appropriately sized (in terms of focal length) so as to ensure maximum coupling of the signal into the output device along a beam entrance angle ($\alpha$).

9 Claims, 2 Drawing Sheets

OPTICAL PACKAGE ARRANGEMENT WITH REDUCED REFLECTIONS

BACKGROUND OF THE INVENTION

1. Field of the Invention

The present invention relates to an optical package arrangement and, more particularly, to such a package which is capable of reducing internal reflections while maintaining all components within the package along a common axis.

2. Description of the Prior Art

In most optical communication systems, it is desirable to prevent reflected signals from re-entering the transmitting device. For example, distributed feedback (DFB) lasers, utilized in high bit rate systems where single mode operation is required, are known to be extremely sensitive to reflected signals. In order to reduce optical reflections, optical isolators are often utlized. One such isolator arrangement being disclosed in U.S. Pat. No. 4,548,478 issued to Shirasaki et al. on Oct. 22, 1985. Although these isolators are able to reduce reflected signals orginating at the output, reflections from the front face of the isolator, or any other elements (windows, filters, etc.) inserted between the transmitting device and the isolator, may still re-enter the transmitting device and cause a degradation in the system performance.

Another approach to the reflection problem is to bevel or tilt various optical elements or surfaces within the package so as to redirect any reflected signal away from the transmitting device. The use of tilts and bevels usually requires that the elements be assembled in an off-axis arrangement. One such arrangement is described in a paper entitled "Destributed-feedback laser diode module with a novel and compact optical isolator for gigabit optical transmission systems" by T. Chikama et al. appearing in the *OFC Proceedings* 1986, Paper No. ME4. FIG. 1 of Chikama et al. paper clearly illustrates the displacement between a DFB laser diode chip and the single mode optical fiber. The loss of cylindrical symmetry between the laser diode and the fiber is considered to adversely impact both the cost and performance of the packaged arrangement. In particular, the eccentricity of this off-axis arrangement necessitates the use of eccentric packaging which must be both rotationally oriented and radially aligned. That is, any ferrule or sleeve component used to attach the off-set fiber to the package must include an off-set bore to accomodate the fiber. Therfore, the ferrule must be oriented and aligned with a high degree of accuracy to ensure alignment of the fiber to the off-axis beam. In contrast, for an on-axis arrangement, a fiber ferrule may be rotated in any manner about the optical axis without affecting the alignment. Clearly, an on-axis arrangement is the preferred alternative.

One prior art technique for maintaining an on-axis alignment while utilizing a beveled fiber to reduce reflections is described in an article entitled "General purpose single-mode laser package provided with a parallel beam output having −60 dB interface feedback", by C. K. Wong et al. appearing the the *Proceedings of ECOC* p. 215-8. As illustrated in FIG. 2C of Wong et al., a modified fiber ferrule is used to hold a beveled fiber at the angle which maximizes coupling of the beam and fiber. In particular, a fiber ferrule is machined to include an eccentric bore such that the combination of the ferrule eccentricity and the fiber bevel allows the output signal to be on-axis. Although the Wong et al. arrangement provides for the output signal to be on-axis, the use of an eccentric fiber ferrule raises the same radial alignment difficulties as discussed above.

Therefore, a need remains in the art for an on-axis optical arrangement which is capable of preventing reflections while maintaining cylindrical symmetry such that radial alignment problems are avoided.

SUMMARY OF THE INVENTION

The need remaining in the prior art is addressed by the present invention which relates to an optical package arrangement and, more particularly, to such a package which is capable of reducing internal reflections while maintaining all components within the package along a common axis.

In accordance with the teachings of the present invention, an optical element (or elements) is inserted between the input device and output device and tilted at a predetermined angle (or angles) with respect to the optical axis to compensate for the effect of a beveled end on an output device.

In one embodiment of the present invention, an optical isolator is tilted at a predetermined angle $\theta$ such that reflections from the front face of the isolator are directed away from a signal source. The tilt angle $\theta$ results in a displacement $\Delta$ between the optical axis and the central ray of the beam as it exits the isolator. As mentioned above, the endface of an output device (e.g., fiber) is beveled at an angle $\beta$ as a further aid in reducing reflections. Therefore, in order to maintain all the optical components along a common axis, the beam entrance angle $\alpha$ at the fiber is controlled as a function of the bevel angle $\beta$, where $\alpha$ is a function of both the displacement $\Delta$ and the focal length f of the receiving lensing optics.

It is an advantage of the present invention that the optical element or elements which are tilted may comprise a number of different components. For example, a window element (which is inserted in some package arrangements to provide hermeticity of the transmitting device by allowing it to be sealed in a package while the light is transmitted through the window to the remainder of the optics) may be oriented at the predetermined tilt angle. In alternative arrangements, it may be required to insert a wavelength filter (for multiplexing or demultiplexing purposes) in line between the input and output devices. As with the isolator described above, these components, when inserted perpendicular to the optical axis, cause reflections to be directed back into the transmitting device. Therefore, by tilting these components and beveling the output fiber in accordance with the present invention, reflections may be minimized while maintaining the on-axis profile of the arrangement. Additionally, any number of these components may be cascaded within the package and tilted (either individually at separate angles, or as a group along a single tilt angle) to provide the advantages of the present on-axis arrangement.

Other and further advantages of the present invention will become apparent during the course of the following discussion and by reference to the accompanying drawings.

BRIEF DESCRIPTION OF THE DRAWING

Turning now to the drawings, where like numerals represent like parts in several views.

DETAILED DESCRIPTION

Figure 1:
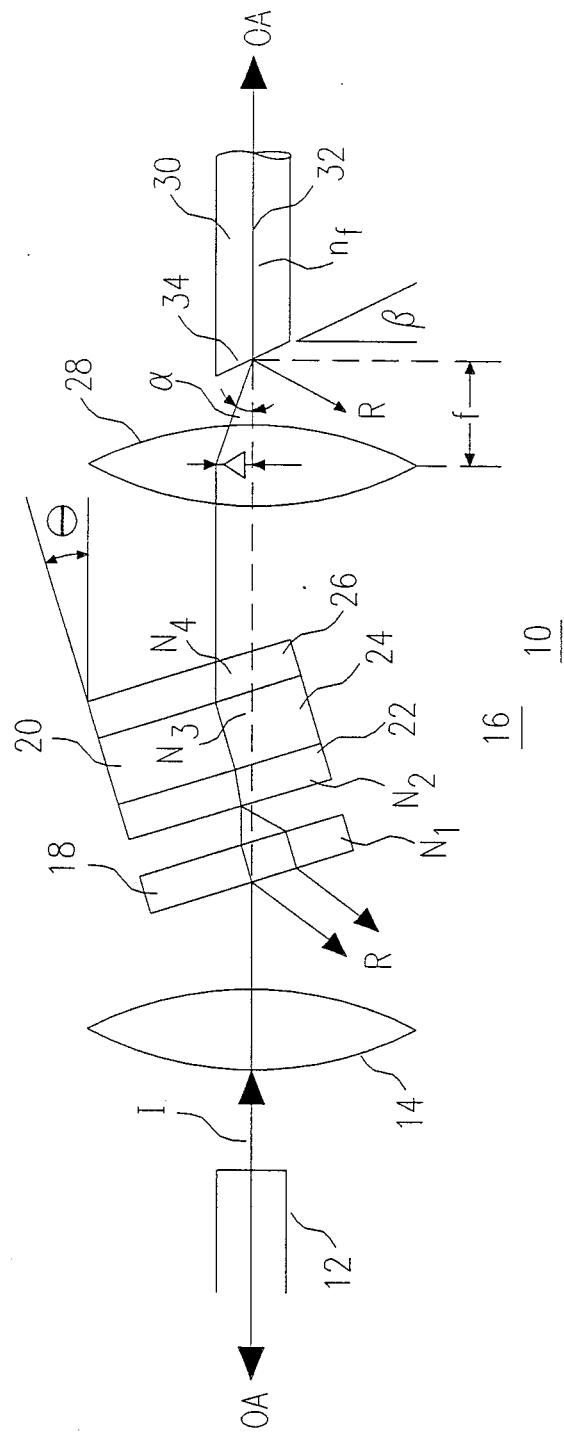
FIG. 1 illustrates, in simplified form, an on-axis arrangement of the present invention, particularly illustrating the various tilt and bevel angles of the various components.

An exemplary arrangement 10 of the present invention, illustrating the various component placements required to maintain an on-axis system, is shown in FIG. 1. In particular, a lightwave signal I, denoted by its central ray, exits a source optical component 12 and is collected by a first lens 14. Source component 12 may comprise an input optical fiber, laser diode, LED, or any other type of device which is capable of launching an optical signal. It is to be understood that the use of lens 14 is exemplary only. Other embodiments of the invention may not require such a device. Returning to FIG. 1, the signal I then passes through optical element 16, where it is known that element 16 would cause reflections of signal I back into component 12 when aligned with the optical axis OA of arrangement 10. Therefore, element 16 is tilted to an angle $\theta$ with respect to optical axis OA so that reflected signals, denoted R in FIG. 1, are directed away from component 12. For the sake of the following discussion, element 16 is illustrated as comprising a first optical device 18, where device 18 may comprises either a window or a filter, and an optical isolator 20, where these components are considered to be the more common elements which may be included in such a package. As shown in FIG. 1, isolator 20 includes a first polarizer 22, a Faraday rotator 24 and a second polarizer 26. The operation of such an isolator is not germane to the present discussion. A complete discussion on the operation of such a device may be found in the Shirasaki et al. reference mentioned above.

Returning to the description of arrangement 10, signal I exiting optical element 16 will be displaced from optical axis OA by a distance denoted $\Delta$ in FIG. 1. In particular, $\Delta$ can be determined by the following relation:

$$\Delta = \sum_{i=1}^{j} \left( \frac{n_i - 1}{n_i} \right) t_i \theta_i,$$

where j is defined as the number of parallel plate components forming optical element 16. In the exemplary arrangement of FIG. 1, the three components forming isolator 20 are all considered as separate plates. The term $n_i$ is defined as the refractive index of each plate (a known quantity), $t_i$ is defined as the thickness of each plate, and $\theta_i$ is the angle of tilt for each plate. In most circumstances, each plate will be fixed as the same angle of tilt so that $\theta_i = \theta$.

Referring back to FIG. 1, the displaced signal I exiting optical element 16 is subsequently focused by a second lens 28 into a optical output component 30. Component 30 may comprise an optical fiber, waveguide, or other suitable component capable of intercepting an optical signal. As illustrated in FIG. 1, output component 30 is positioned so that its core region 32 is aligned with the input component 12 along optical axis OA.

In order for the signal to be properly coupled into core region 32, the displacement distance $\Delta$ should satisfy the following condition:

$$\Delta = f \tan(\alpha),$$

where f is defined as the focal length of second lens 28, as shown in FIG. 1, and $\alpha$ is defined as the beam entrance angle (between optical axis OA and central ray of signal I). Since $\alpha$ will be a relatively small angle, tan($\alpha$) is approximately equal to $\alpha$, and equation (2) reduces to:

$$\Delta = f\alpha$$

As seen in FIG. 1, endface 34 of component 30 is beveled at a predetermine angle $\beta$ with respect to the plane perpendicular to optical axis OA. The bevel, as mentioned above, will further aid in redirecting reflected signals R away from input component In order to provide the maximum coupling of signal I into core region 32 of component 30, the following relation should be maintained:

$$\alpha = (n_f - 1)\beta,$$

where $n_f$ is defined as the refractive index of core region 32.

Since the thickness and refractive indicies of optical element 16 are known quantities, as is the refractive index and bevel angle of component 30, equations (1), (3) and (4) may be combined and solved for the tilt angle $\theta$ required to provide an on-axis system. In particular, the follwoing relation must be satisfied:

$$\theta = \frac{f(n_f - 1)\beta}{\sum_{i=1}^{j} \left( \frac{n_i - 1}{n_i} \right) t_i}$$

EXAMPLE

The following is an example of the determination of the required tilt angle $\theta$ for an exemplary arrangement such as illustrated in FIG. 1.

Assume that both window (filter) element 18 and isolator 20 are to be inclined at the same angle $\theta$. This is not an unusual assumption, since the use of a single angle will aid in the packaging of the arrangement. Let component 30 be beveled at an angle $\beta$ of 6° and the refractive index $n_f$ of core region 32 be approximately equal to 1.5. Assume second lens 28 has a focal length f of approximately 2 mm. Window 18 is defined as having a refractive index $n_1$ of 1.8 and a thickness $t_1$ of 0.5 mmm. First polarizer 22 of isolator 16 is defined as having a refractive $n_2$ of 1.5 and a thickness $t_2$ of 1.0 mm. Faraday rotator 24 of isolator is formed to comprise a refractive index $n_3$ of 2.2 and a thickness $t_3$ of 1.0 mm. Lastly, second polarizer 26 is formed to comprise a refractive index $n_4$ of 1.5 and a thickness $t_4$ of 1.0 mm. Solving equation (4) for $\theta$ results in a value of 0.073 radians, or 4.2°.

It is to be noted that the desired results of the present invention (reduction of reflections while maintaining an on-axis arrangement) may be achieved by merely adjusting the angle of tilt $\theta$ until the central ray of signal I passes through the appropriate angle $\alpha$ at the core region of the beveled output component. The mathematics discussed above, although useful in understanding the principles of the invention, need not be utilized in each instance.

Figure 2:
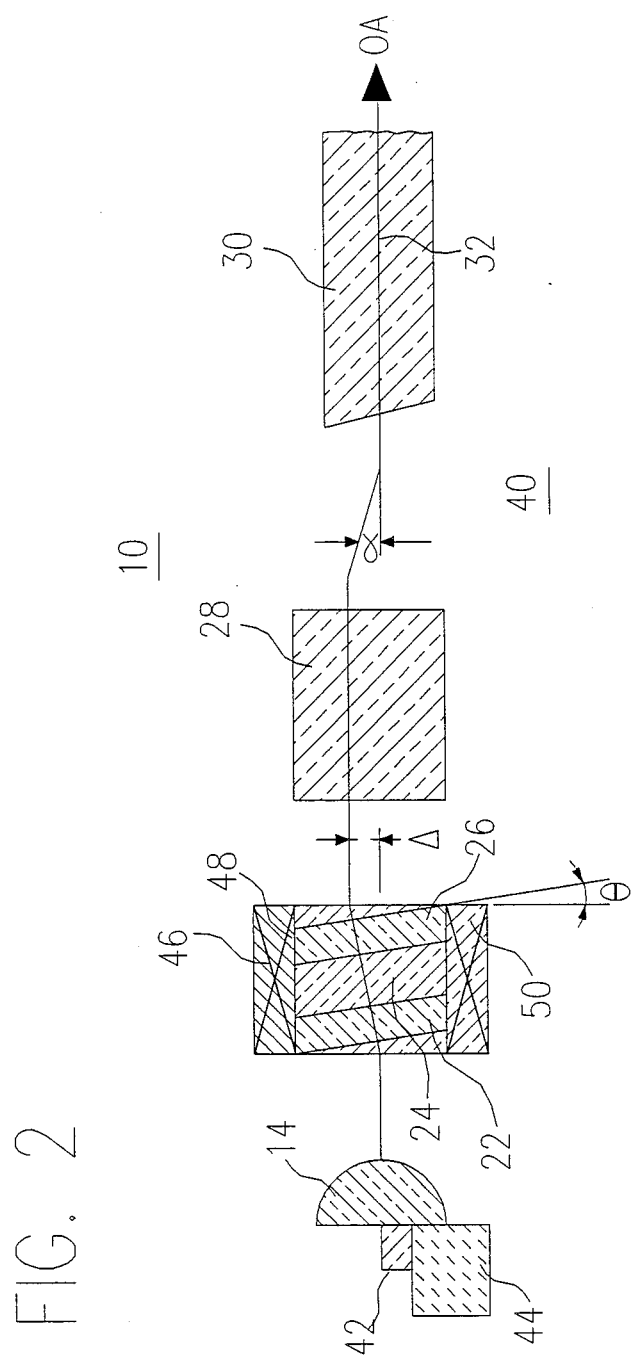
FIG. 2 illustrates an exemplary arrangement of the present invention including a laser diode and a beveled optical fiber, wherein an isolator is inserted between the laser diode and fiber and tilted at a predetermined angle so as to maintain all components (laser, lens, isolator, fiber) along a common axis.

FIG. 2 illustrates a particular embodiment of the present invention especially suited for use with a semiconductor laser diode transmitted device. In particular, a laser diode 42 is illustrated as attached to a laser mount 44, where first lens 14 is attached to mount 44 and positioned in front of diode 42. In this particular embodiment, referred to as a confocal arrangement, lens 14 comprises a plano convex silicon lens. An isolator 20, surrounded by a magnetizing element 46 is oriented at a predetermined tilt angle $\theta$ using either of the methods described above (calculated angle $\theta$, or adjusted angle $\theta$). As shown in FIG. 2, isolator 20 is formed to comprise a rhombic shape so as to include parallel top and bottom faces 48 and 50, respectively. With this particular geometry, a conventional magnetizing element may be utilized while preserving the angle along face 52 so that reflected signals R are directed away from laser diode 42. Second lens 28 is illustrated in FIG. 2 as comprising a graded index (GRIN) lens which is sized to include a predetermined focal length f. As seen in FIG. 2, optical output component 30 is illustrated as an optical fiber which includes a core region 32.

I claim:

1. An arrangement for reducing effects of reflections in an optical communication system, the arrangement comprising:

optical transmitting means capable of launching a lightwave signal into said arrangement;

optical receiving means for receiving said lightwave signal, said receiving means disposed along a common optical axis with said transmitting means, wherein said receiving means includes a beveled endface ($\beta$) capable of redirecting reflected signals at said beveled endface away from said optical axis;

lensing means disposed between said transmitting means and said receiving means for focusing said lightwave signal towards said receiving means; and at least one optical element disposed between said transmitting means and said lensing means along said common optical axis said element tilted at a predetermined angle ($\theta$) with respect to said optical axis so as to redirect reflected signals at said at least one optical element entrance away from said optical axis and cause said optical signal exiting said lensing means to be directed into said receiving means along a predetermined beam entrance angle ($\alpha$).

2. An arrangment as defined in claim 1 wherein the receiving means comprises an optical fiber having a defined refractive index $n_f$ and an endface beveled at an angle $\beta$, the lensing means has a predetermined focal length f, and the at least one optical element comprises a predetermined refractive index n and thickness t, wherein the angle of tilt $\theta$ of said at least one optical element is determined approximately from the relation $$\theta = f(n_f - 1)\beta \frac{n}{(n - 1)t} .$$

3. An arrangement as defined in claim 1 wherein the at least one optical element comprises an optical isolator.

4. An arrangement as defined in claim 3 wherein the isolator comprises a Faraday rotator interposed between a pair of polarizing plates.

5. An arrangement as defined in claim 1 wherein the at least one optical element comprises an optical window.

6. An arrangement as defined in claim 1 wherein the at least one optical element comprises an optical filter.

7. An arrangement as defined in claim 1 wherein the at least one optical element comprises a cascaded arrangement of an optical window and an optical isolator.

8. An arrangement as defined in claim 7 wherein the optical window is tilted at a first angle and the isolator is tilted at a second angle, the combination of angles offsetting the bevel angle of the receiving means.

9. An arrangement as defined in claim 7 wherein the optical window and the isolator are tilted at substantially the same angle.

* * * * *